(12) United States Patent
Wang et al.

(10) Patent No.: US 12,389,444 B2
(45) Date of Patent: Aug. 12, 2025

(54) CHANNEL OCCUPANCY RATIO CALCULATION

(71) Applicant: QUALCOMM Incorporated, San Diego, CA (US)

(72) Inventors: Hua Wang, Basking Ridge, NJ (US); Sony Akkarakaran, Poway, CA (US); Jung Ho Ryu, Fort Lee, NJ (US); Tao Luo, San Diego, CA (US); Junyi Li, Greentown, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/625,107

(22) Filed: Apr. 2, 2024

(65) Prior Publication Data

US 2024/0251439 A1    Jul. 25, 2024

Related U.S. Application Data

(62) Division of application No. 17/231,538, filed on Apr. 15, 2021, now Pat. No. 11,979,903.

(51) Int. Cl.
*H04W 72/56* (2023.01)
*H04W 24/08* (2009.01)
(Continued)

(52) U.S. Cl.
CPC ......... *H04W 72/569* (2023.01); *H04W 24/08* (2013.01); *H04W 72/1263* (2013.01); *H04W 72/20* (2023.01)

(58) Field of Classification Search
CPC .. H04W 72/1263; H04W 72/20; H04W 24/08
See application file for complete search history.

(56) References Cited

U.S. PATENT DOCUMENTS

2020/0235887 A1*  7/2020  Hou ................. H04L 5/0053
2020/0382992 A1* 12/2020  Shilov ............... H04W 72/56
(Continued)

FOREIGN PATENT DOCUMENTS

WO    2021067730 A1    4/2021

OTHER PUBLICATIONS

3GPP TS 38.214: "3rd Generation Partnership Project, Technical Specification Group Radio Access Network, NR, Physical layer procedures for data (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, XP052000310, 171 Pages, Section 8.1.6.

(Continued)

*Primary Examiner* — Sulaiman Nooristany
(74) *Attorney, Agent, or Firm* — Procopio, Cory, Hargreaves & Savitch LLP/QUALCOMM Incorporated

(57) ABSTRACT

A base station may instruct a UE to use at least one weighting factor associated with a CR for the UE, and the UE may apply the at least one weighting factor to the one or more resources scheduled for the PSSCH transmission to determine the CR. The UE may transmit the PSSCH in the one or more resources of the at least one slot based on the determined CR being less than or equal to a CR threshold value. The at least one weighting factor may be applied to the one or more resources in each of multiple slots scheduled for transmission of a PSSCH.

20 Claims, 12 Drawing Sheets

(51) Int. Cl.
  *H04W 72/1263* (2023.01)
  *H04W 72/20* (2023.01)
  *H04W 72/566* (2023.01)

(56) References Cited

U.S. PATENT DOCUMENTS

| | | |
|---|---|---|
| 2022/0338168 A1 | 10/2022 | Wang et al. |
| 2022/0338209 A1 | 10/2022 | Wang et al. |
| 2022/0408481 A1* | 12/2022 | Lee .................. H04W 72/20 |
| 2023/0063472 A1* | 3/2023 | Freda ............... H04W 52/0274 |

OTHER PUBLICATIONS

International Search Report and Written Opinion—PCT/US2022/020811—ISA/EPO—Jun. 3, 2022.

Samsung: "On QoS Management for NR Sidelink", 3GPP TSG RAN WG1 #100, 3GPP Draft, R1-2000622, 3rd Generation Partnership Project (3GPP), Mobile Competence Centre, 650, Route Des Lucioles, F-06921 Sophia- Antipolis Cedex, France, vol. RAN WG1, No. e-Meeting, Feb. 24, 2020-Mar. 6, 2020, Feb. 14, 2020 (Feb. 14, 2020), XP051852966, 4 Pages, the whole document.

Vivo: "Discussion on Mode 2 Resource Allocation Mechanism", 3GPP TSG RAN WG1 #98bis meeting, 3GPP Draft, R1-1911420, Discussion On Mode 2 Resource Allocation Mechanism, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 13, 2019 (Oct. 13, 2019), XP051800860, pp. 1-14, the whole document.

* cited by examiner

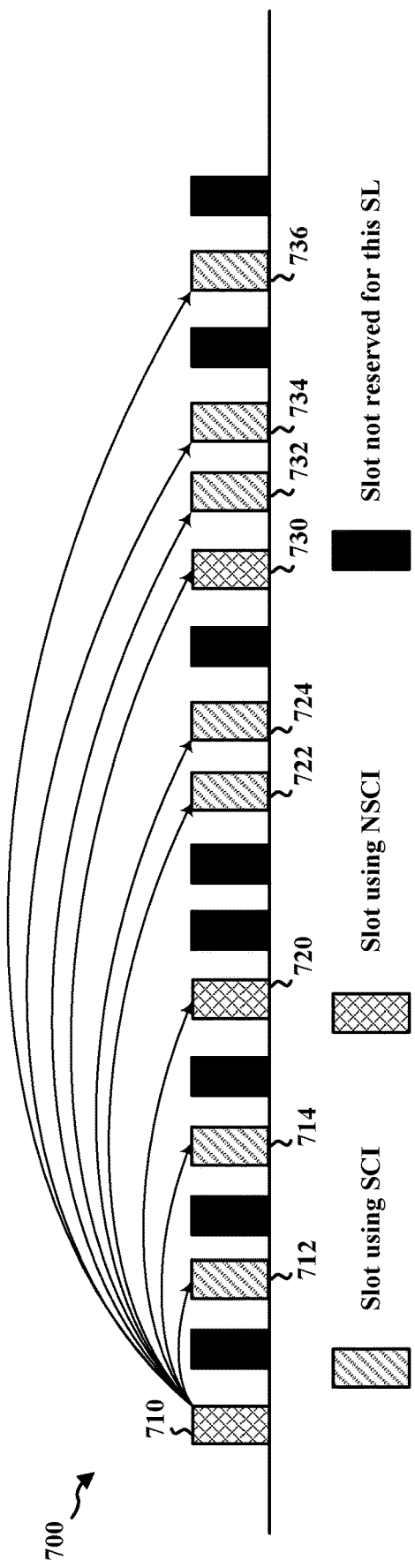
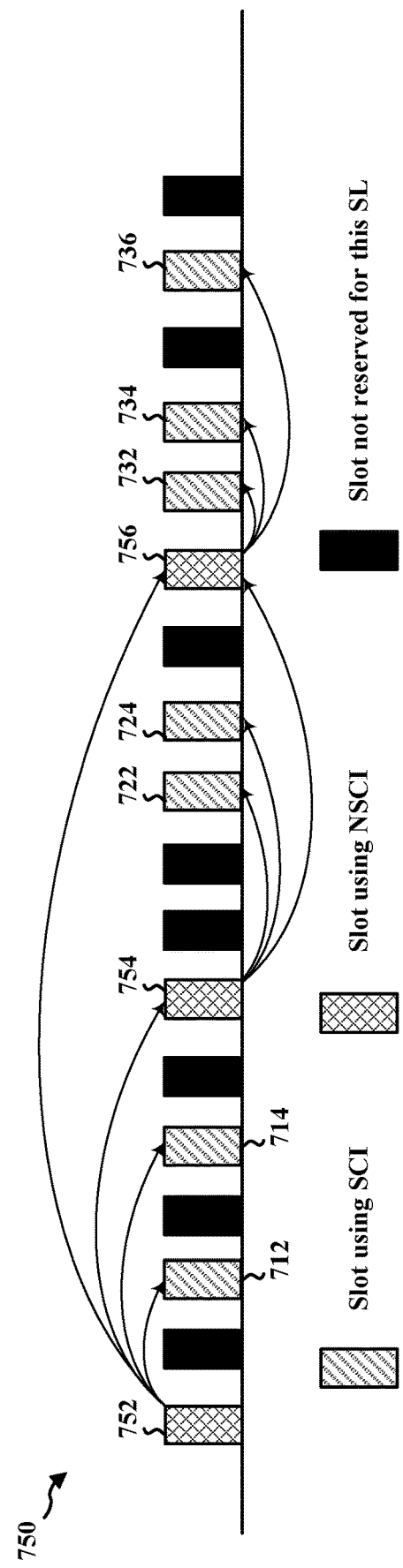
FIG. 7A
FIG. 7B

CHANNEL OCCUPANCY RATIO CALCULATION

CROSS REFERENCE TO RELATED APPLICATION(S)

This application is a divisional of U.S. application Ser. No. 17/231,538, entitled "Channel Occupancy Ratio Calculation" and filed on Apr. 15, 2021, which is expressly incorporated by reference herein in its entirety.

INTRODUCTION

The present disclosure relates generally to communication systems, and more particularly, to a sidelink (SL) communication.

Wireless communication systems are widely deployed to provide various telecommunication services such as telephony, video, data, messaging, and broadcasts. Typical wireless communication systems may employ multiple-access technologies having the capability to supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on SL. There exists a need for further improvements in SL technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a user equipment (UE) is provided. The method includes transmitting SL control information (SCI) scheduling one or more resources for physical sidelink shared channel (PSSCH) transmission in at least one slot, applying at least one weighting factor to the one or more resources scheduled for the PSSCH transmission to determine a channel occupancy ratio (CR) for the UE, and transmitting the PSSCH in the one or more resources scheduled for the PSSCH in the at least one slot based on the determined CR being less than or equal to a CR threshold value.

In an aspect of the disclosure, an apparatus for wireless communication at the UE is provided. The apparatus includes means for transmitting SCI scheduling one or more resources for PSSCH transmission in at least one slot, means for applying at least one weighting factor to the one or more resources scheduled for the PSSCH transmission to determine a CR for the UE, and means for transmitting the PSSCH in the one or more resources scheduled for the PSSCH in the at least one slot based on the determined CR being less than or equal to a CR threshold value.

In an aspect of the disclosure, an apparatus for wireless communication at the UE is provided. The apparatus include memory and at least one processor coupled to the memory, the memory and the memory and the at least one processor configured to transmit SCI scheduling one or more resources for PSSCH transmission in at least one slot, apply at least one weighting factor to the one or more resources scheduled for the PSSCH transmission to determine a CR for the UE, and transmit the PSSCH in the one or more resources scheduled for the PSSCH in the at least one slot based on the determined CR being less than or equal to a CR threshold value.

In an aspect of the disclosure, a non-transitory computer-readable storage medium, is provided. The computer-readable medium storing computer executable code at the UE, the code when executed by a processor causes the processor to transmit SCI scheduling one or more resources for PSSCH transmission in at least one slot, apply at least one weighting factor to the one or more resources scheduled for the PSSCH transmission to determine a CR for the UE, and transmit the PSSCH in the one or more resources scheduled for the PSSCH in the at least one slot based on the determined CR being less than or equal to a CR threshold value.

In an aspect of the disclosure, a method of wireless communication at a base station is provided. The method includes configuring a UE with one or more parameters for SL communication, and instructing a UE to apply at least one weighting factor associated with a CR for the UE.

In an aspect of the disclosure, an apparatus for wireless communication at the base station is provided. The apparatus includes means for configuring a UE with one or more parameters for SL communication, and means for instructing a UE to apply at least one weighting factor associated with a CR for the UE.

In an aspect of the disclosure, an apparatus for wireless communication at the base station is provided. The apparatus include memory and at least one processor coupled to the memory, the memory and the memory and the at least one processor configured to configure a UE with one or more parameters for SL communication, and instruct a UE to apply at least one weighting factor associated with a CR for the UE.

In an aspect of the disclosure, a non-transitory computer-readable storage medium, is provided. The computer-readable medium storing computer executable code at the base station, the code when executed by a processor causes the processor to configure a UE with one or more parameters for SL communication, and instruct a UE to apply at least one weighting factor associated with a CR for the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 7A and 7B are example configurations of an SL wireless communication.

DETAILED DESCRIPTION

Figure 1:
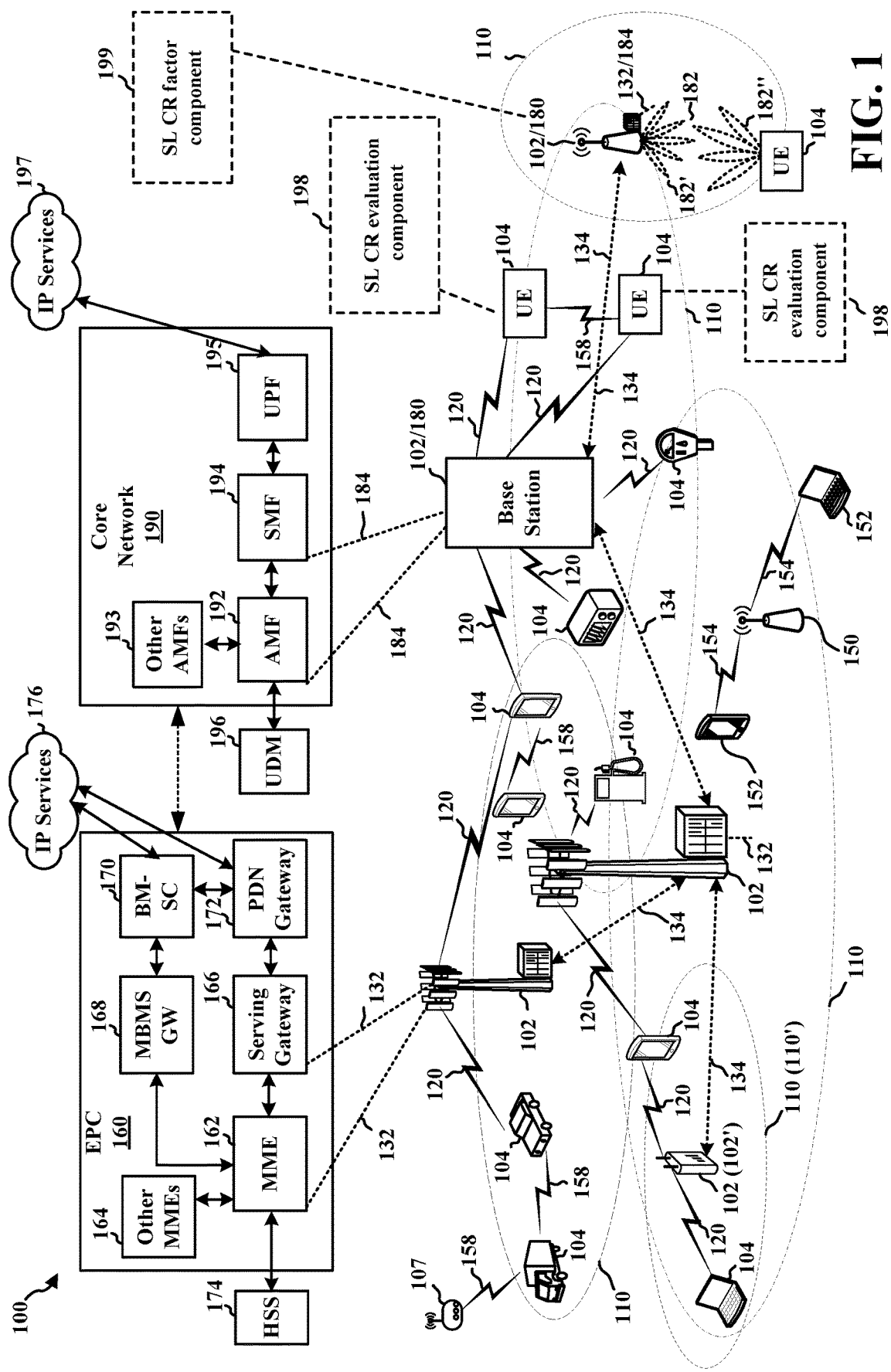
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

Communication of data may be exchanged between wireless devices based on sidelink. For example, UEs may communicate with each other using device-to-device (D2D) communication link, and the communication link may use one or more sidelink channels. A UE may transmit a physical sidelink control channel (PSCCH) including sidelink control information (SCI), scheduling at least one resource for transmitting a physical sidelink shared channel (PSSCH). Multiple UEs may share the resources to schedule and transmit the PSSCH, and the UEs may implement a congestion control scheme.

In some aspects, a UE may perform congestion control in SL communication using channel busy ratio (CBR) and/or channel occupancy ratio (CR). The CBR may be defined as an estimated number of time-frequency resources observed by a UE as being used by the network divided by the number of the total available time-frequency resources. The CR may be defined as an estimated number of time-frequency resources used by the divided by the number of total available time-frequency resources. The UE may consider the CBR and/or the CR when determining whether to transmit an SL transmission.

The reliability/range of the SL communications may be improved by increasing a number of repeated SL transmissions, e.g., to more than 3 repeated transmissions, for each resource reservation. As described herein, a group of multiple slots may be structured with a header slot and one or more additional slots, i.e., non-header slots. The header slot of the group of multiple slots may include control information for the group of multiple slots (e.g., multiple slot SL control information (MSCI)), and the one or more additional slots/non-header slots may be scheduled by the MSCI and do not include the MSCI. In some aspects, the group of multiple slots having the structure including the header slot and one or more additional slots may be referred to as a "super-slot" indicating that it is based on a structure including a group of multiple slots or a set of multiple slots. In some aspects, the MSCI may be transmitted in one slot per group of multiple slots. The term "header slot" may refer to the slot that includes the MSCI. In other aspects, the slot including the MSCI may be referred to by a different name. In one example, the slots that are scheduled later in time-domain by the MSCI may be less likely to be used for SL transmission or may be more likely to be overridden by other transmissions.

Aspects presented herein provide for improved congestion control for slots scheduled by an MSCI. The UE may evaluate the CR measurement based on a number of the total number of sub-channels in the granted slots, and the UE may determine whether to transmit the PSSCH based on the CR measurement. The base station may provide a weighting factor for the UE to apply when estimating the number of the total number of sub-channels in the granted slots. Since the granted slots for sub-channels may be overridden by other SL transmission with higher priority, the number of granted slots for sub-channels that may be overridden by other SL transmission with higher priority may have a lower weighting factor than the number of sub-channels already used for its transmissions. The base station may provide weighting factor that is less than or equal to 1. Accordingly, the UE may increase the efficiency of SL resource management especially in repeated transmission while performing congestion control using the evaluated CR measurement.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on SL. For example, some UEs 104 may communicate with each other directly using a device-to-device (D2D) communication link 158. In some examples, the D2D communication link 158 may use the DL/UL WWAN spectrum. The D2D communication link 158 may use one or more SL channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of SL communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. SL communication may be based on V2X or other D2D communication, such as Proximity Services (ProSc), etc. In addition to UEs, SL communication may also be transmitted and received by other transmitting and receiving devices, such as Road Side Unit (RSU) 107, etc. SL communication may be exchanged using a PC5 interface, such as described in connection with the example in FIG. 2. Although the following description, including the example slot structure of FIG. 2, may provide examples for SL communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on SL, may include an SL CR evaluation component 198 configured to transmit SCI scheduling one or more resources for PSSCH transmission in at least one slot, apply at least one weighting factor to the one or more resources scheduled for the PSSCH transmission to calculate a CR for the UE, and transmit the PSSCH in the one or more resources of the at least one slot based on the calculated CR being less than or equal to a CR threshold value. The base station 180 may include an SL CR factor component 199 configured to configure a UE with one or more parameters for SL communication, and configure a UE to use at least one weighting factor associated with a CR for the UE.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL)

(also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB (e.g., 180) may operate in a traditional sub 6 GHz spectrum, in millimeter wave frequencies, and/or near millimeter wave frequencies in communication with the UE 104. When the gNB (e.g., 180) operates in millimeter wave or near millimeter wave frequencies, the gNB (e.g., 180) may be referred to as a millimeter wave base station. The millimeter wave base station (e.g., 180) may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for SL communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for SL communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
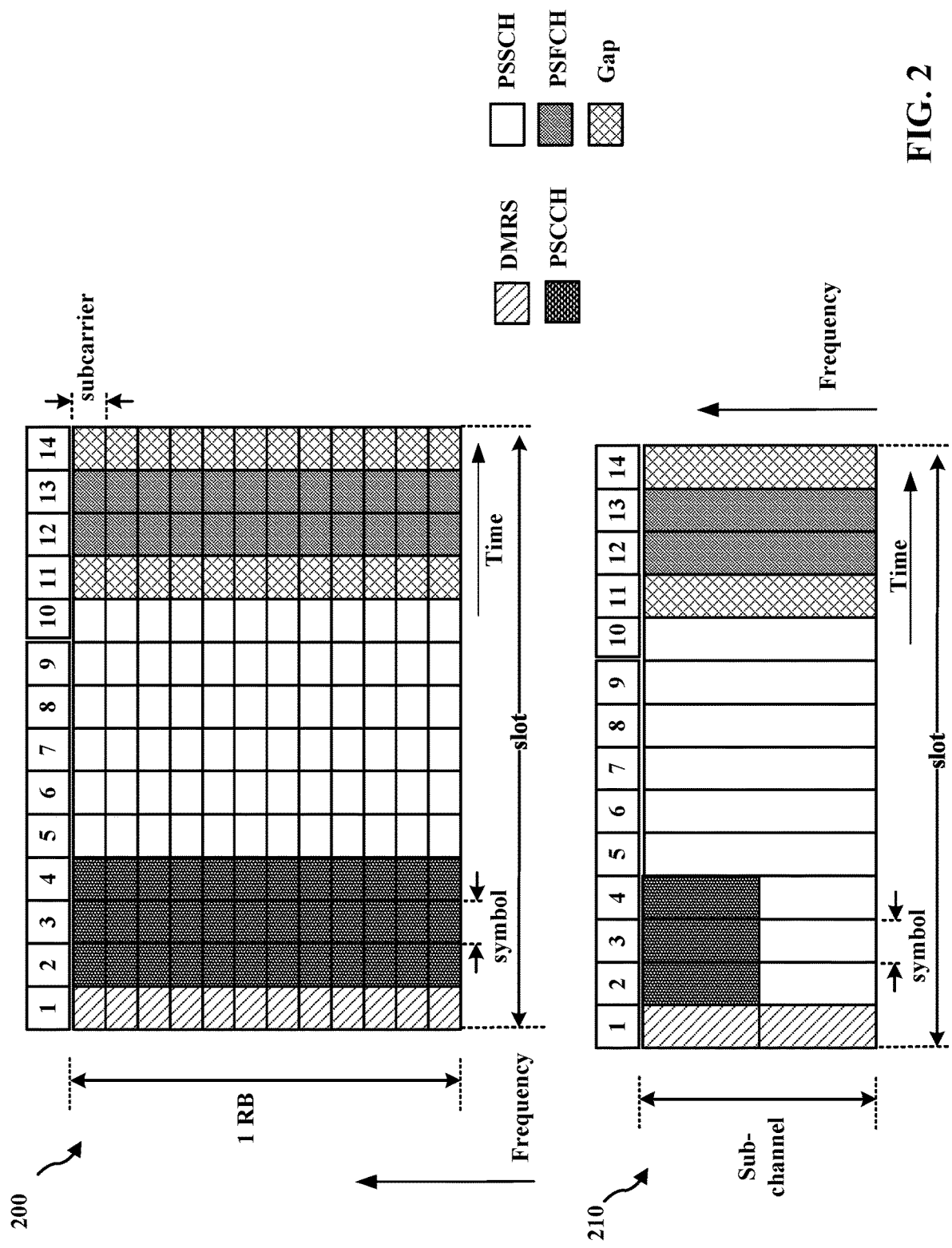
FIG. 2 illustrates example aspects of an SL slot structure.

FIG. 2 includes diagrams 200 and 210 illustrating example aspects of slot structures that may be used for SL communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other SL communication may have a different frame structure and/or different channels for SL communication. A frame (10 ms) may be divided into 10 equally sized subframes (1 ms). Each subframe may include one or more time slots. Subframes may also include minislots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical SL control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for an SL transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical PSSCH occupies at least one subchannel. The PSCCH may include a first portion of SL control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical SL feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
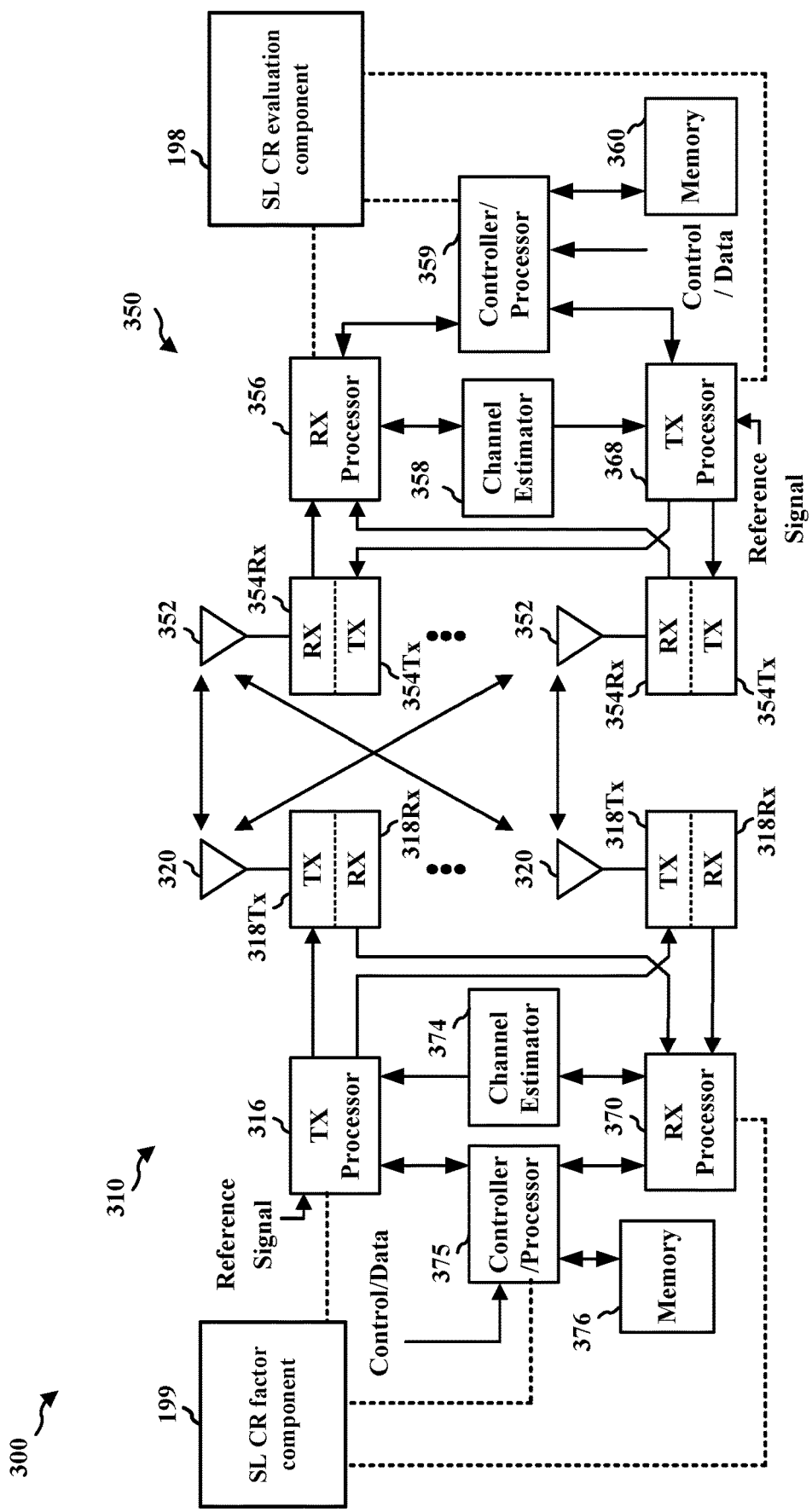
FIG. 3 is a diagram illustrating an example of a first device and a second device involved in wireless communication based, e.g., on SL.

FIG. 3 is a block diagram 300 of a first wireless communication device 310 in communication with a second wireless communication device 350 based on SL. In some examples, the devices 310 and 350 may communicate based on V2X or other D2D communication. The communication may be based on SL using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, onto mapping physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate an RF carrier with a respective spatial stream for transmission.

At the device 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Figure 4:
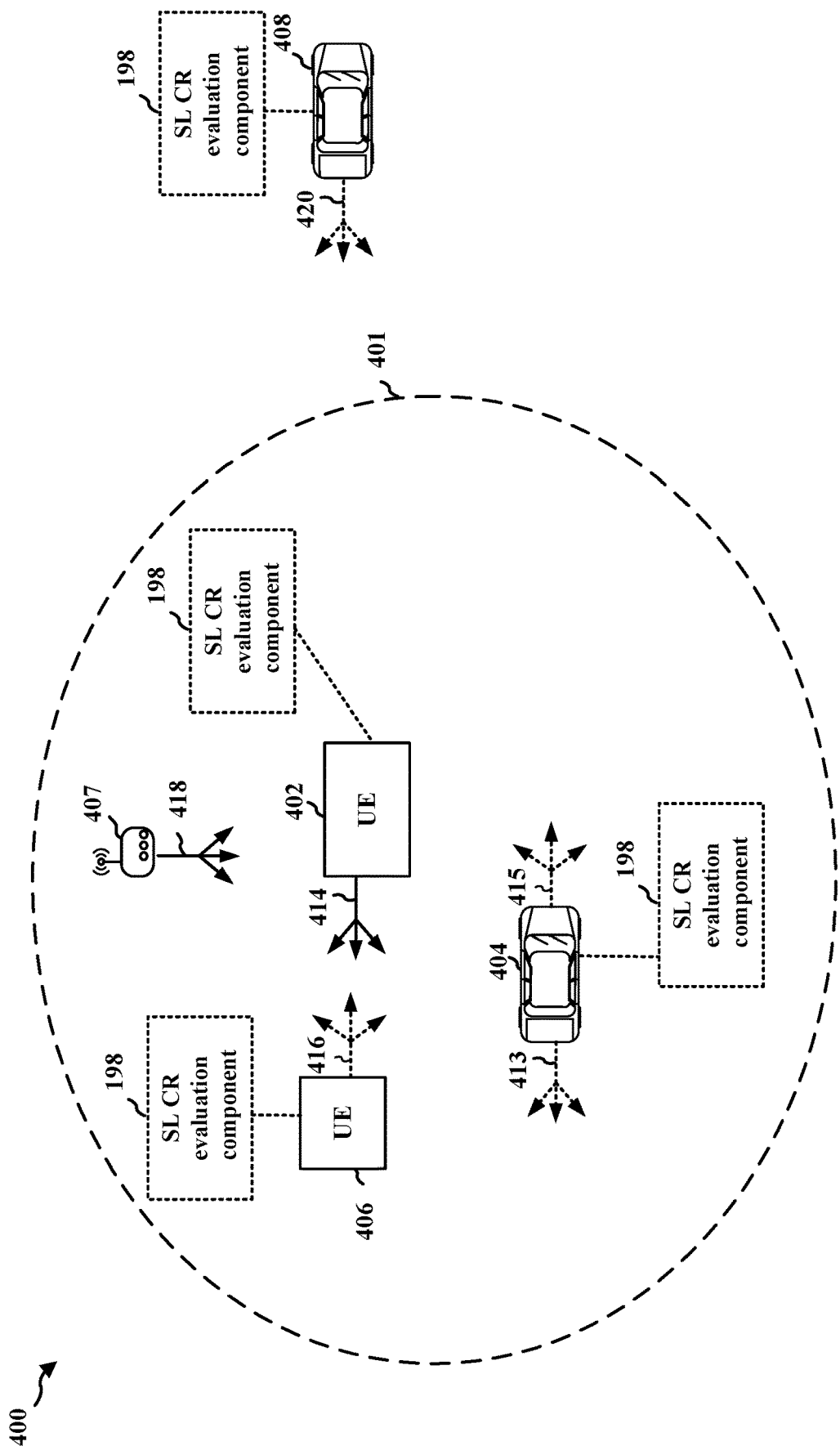
FIG. 4 illustrates example aspects of SL communication between devices, in accordance with aspects presented herein.

FIG. 4 illustrates an example 400 of SL communication between devices. The communication may be based on a slot structure comprising aspects described in connection with FIG. 2. For example, the UE 402 may transmit an SL transmission 414, e.g., comprising a control channel (e.g., PSCCH) and/or a corresponding data channel (e.g., PSSCH), that may be received by UEs 404, 406, 408. A control channel may include information (e.g., SL control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, and/or 408 may each have the capability for SL transmission in addition to SL reception. Thus, UEs 404, 406, 408 are illustrated as transmitting SL transmissions 413, 415, 416, and/or 420. The SL transmissions 413, 414, 415, 416, 420 may be unicast, broadcast or multicast to nearby devices. For example, UE 404 may transmit communication (e.g., 413 and/or 415) intended for receipt by other UEs within a range 401 of UE 404, and UE 406 may transmit communication (e.g., 416). Additionally, or alternatively, RSU 407 may receive communication from and/or transmit communication 418 to UEs 402, 404, 406, and/or 408. One or more of the UEs 402, 404, 406, and/or 408 or the RSU 407 may comprise an SL CR evaluation component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for SL communication and may allocate resources to different UEs 104 to use for SL transmissions. In this first mode, a UE receives the allocation of SL resources from the base station 102 or 180. In a second resource allocation mode (which may be referred to herein as "Mode 2"), distributed resource allocation may be provided. In Mode 2, each UE may autonomously determine resources to use for SL transmission. In order to coordinate the selection of SL resources by individual UEs, each UE may use a sensing technique to monitor for resource reservations by other SL UEs and may select resources for SL transmissions from unreserved resources. Devices communicating based on SL, may determine one or more radio resources in the time and frequency domain that are used by other devices in order to select transmission resources that avoid collisions with other devices. The SL transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for SL transmission, e.g., without a central entity such as a base station indicating the resources for the device. A first UE may reserve the selected resources in order to inform other UEs about the resources that the first UE intends to use for SL transmission(s).

In some examples, the resource selection for SL communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected SL resource has been reserved by other UE(s) before selecting an SL resource for a data transmission. If the UE determines that the SL resource has not been reserved by other UEs, the UE may use the selected SL resource for transmitting the data, e.g., in a PSSCH transmission. The UE may estimate or determine which radio resources (e.g., SL resources) may be in-use and/or reserved by others by detecting and decoding SL control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for SL transmission by the UE, and the UE may select/reserve resources for an SL transmission from the resources that are unused and therefore form the set of candidate resources. The UE may continuously perform sensing for SCI with resource reservations in order to maintain a set of candidate resources from which the UE may select one or more resources for an SL transmission. Once the UE selects a candidate resource, the UE may transmit SCI indicating its own reservation of the resource for an SL transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on SL.

Figure 5:
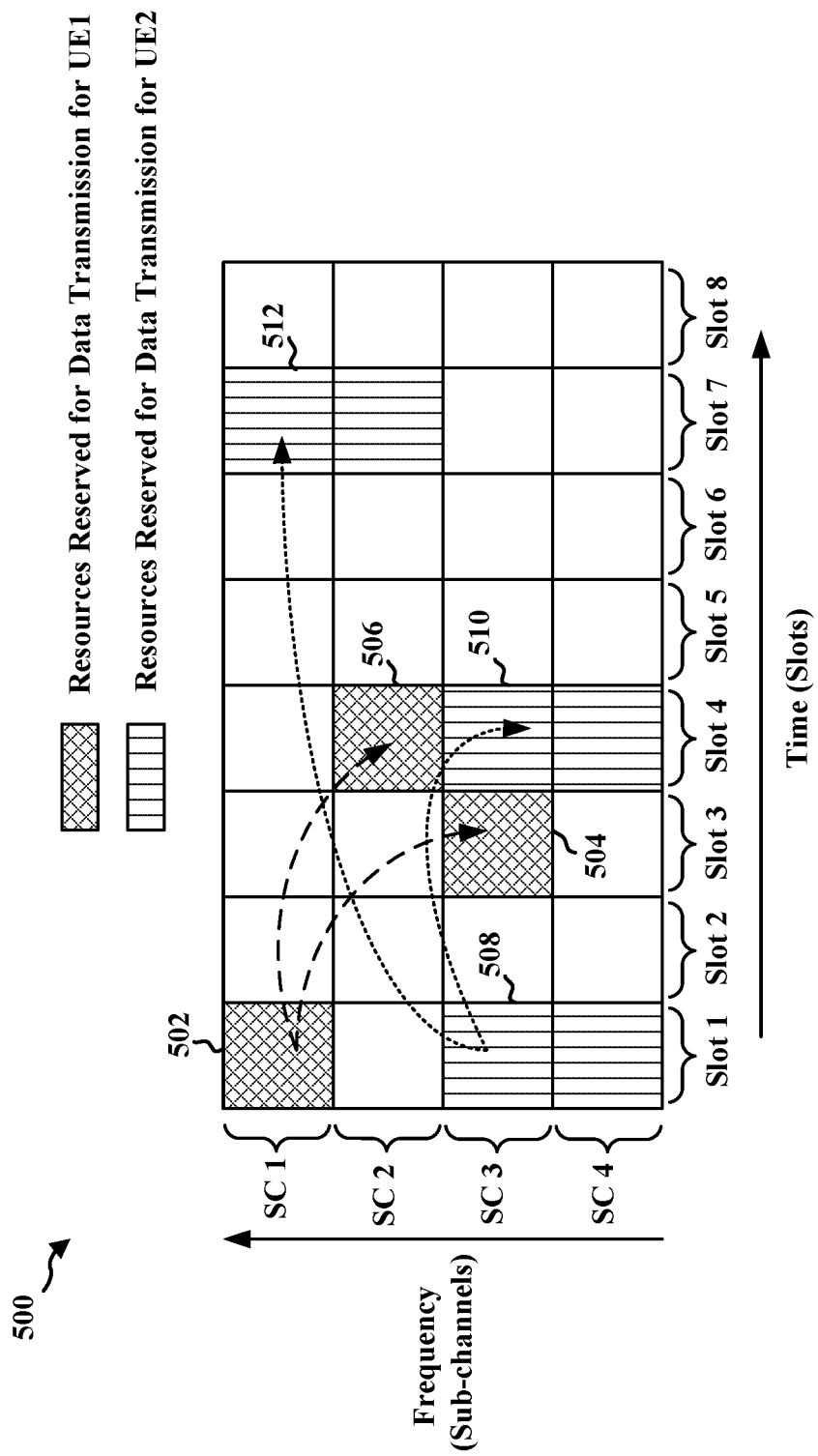
FIG. 5 illustrates examples of resource reservation for SL communication.

FIG. 5 is an example 500 of time and frequency resources showing reservations for SL transmissions. The resources may be comprised in an SL resource pool, for example. The resource allocation for each UE may be in units of one or more sub-channels in the frequency domain (e.g., sub-channels SC 1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for an SL resource that has been reserved and/or used by other UE(s), such as by measuring the RSRP of the message (e.g., the SCI) that reserves the SL resource. Based at least in part on the signal/channel measurement, the UE may consider using/reusing the SL resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions (e.g., 508, 510, and 512).

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for SL transmission (e.g., a PSSCH transmission) by the UE. There may be a time gap between the UE's selection of the resources and the UE transmitting SCI reserving the resources.

Figure 6:
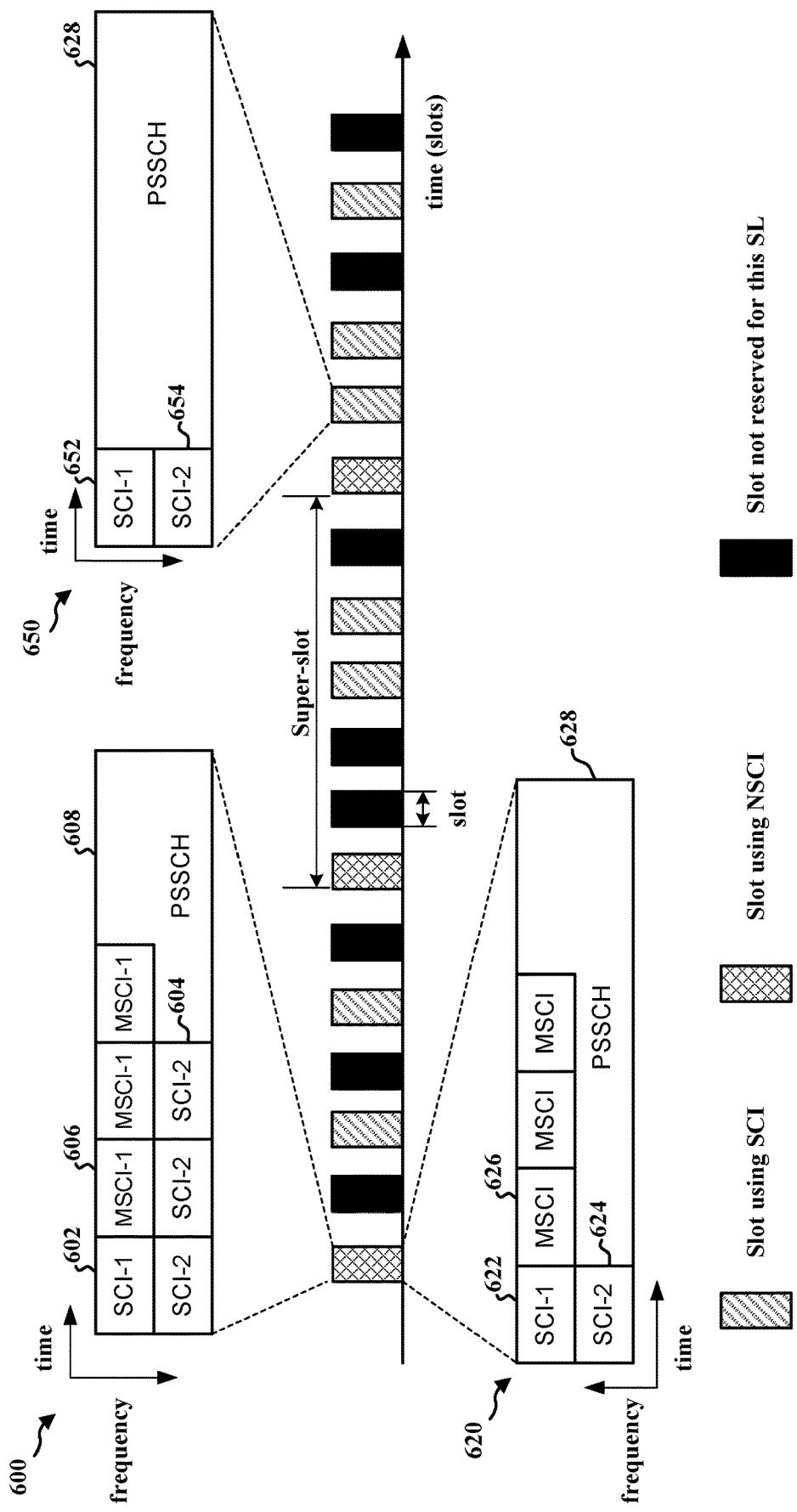
FIG. 6 an example configuration of an SL wireless communication.

FIG. 6 is an example configuration of an SL wireless communication. FIG. 6 illustrates example slot 600 and 620, including a multiple-slot SCI (MSCI) for a group of multiple slots and single slot SCI, and an example slot 650 including the single slot SCI. A transmitting UE may transmit multiple-slot SL control information (MSCI) configured to reserve more resources at one time than may be reserved by single slot SL control information (SCI), such as first stage SCI (SCI-1) and second stage SCI (SCI-2). The MSCI may be associated with a frame structure that includes a group of multiple slots including a first slot/header slot for the MSCI and one or more additional slots/non-header slots that do not include the MSCI. Thus, the MSCI may schedule resources for more SL transmissions/retransmission than the three transmissions described in connection with FIG. 5. In some aspects, the group of multiple slots may be referred to as a "super-slot," indicating that it is based on a structure including a group of multiple slots. In some aspects, the MSCI may be transmitted once per group of multiple slots. The term "header slot" may be used to refer to the slot that includes the MSCI. In other aspects, the slot including the MSCI may be referred to by a different name.

The group of multiple slots may include more than one slot scheduled by the MSCI, e.g., and may include more than two slots scheduled by the MSCI. In some aspects, the MSCI may be provided once every group of multiple slots, e.g., in one slot of the group of multiple slots. In some aspects, the MSCI may be transmitted in the first slot of the group of multiple slots and not in the other slots of the group of multiple slots. Here, the first slot (or the header) of the group of multiple slots may be designated as a header slot. Other SCI (e.g., SCI as described in connection with FIG. 5 that is not for a group of multiple slots) may appear in all the slots, scheduling the subsequent slot. That is, one group of multiple slots may include one header slot, and each header slot may include at least one MSCI scheduling k number of groups of multiple slots including the group of multiple slots that the MSCI is included. FIG. 6 illustrates that a single slot 650 includes one single slot SCI-1 652 and one single slot SCI-2 654 and PSSCH 628.

In some aspects, the multi slot SL SCI may have various formats. In one aspect, the multi slot SL SCI format may include at least one of single slot SCI-1, MSCI-1, or repeated single slot SCI-2. FIG. 6 illustrates that second example slot 600 includes one single slot SCI-1 602, 3 repeated single slot SCI-2 604, three MSCI-1 606, and the PSSCH 608.

In another aspect, the multi slot SL SCI format may include at least one of single slot SCI-1, single slot SCI-2, or at least one MSCI. The MSCI may combine the MSCI-1 and MSCI-2. FIG. 6 illustrates that second example slot 620 includes one single slot SCI-1 622, 3 repeated single slot SCI-2 624, three MSCI-1 626, and the PSSCH 628.

In one aspect, the multi slot SL SCI format may use a reserved bit in the single slot SCI-1 to indicate that it is a multiple slot SL format, and the multi slot SL SCI format may not include the single slot SCI-2. In some aspects, the MSCI may occupy the whole slot without PSSCH. That is, the slot may include the MSCI and not include the PSSCH.

FIGS. 7A and 7B are example configurations 700 and 750 of an SL wireless communication. The SL MSCI may reserve time-frequency resources for up to k number of groups of multiple slots. The MSCI may schedule resources for the subsequent (k−1) number of header slots. The MSCI may reduce the receiving UE's subsequent searching for MSCI. That is, since one MSCI may indicate the time-frequency resource for the subsequent (k−1) number of header slots for the receiving UE, the receiving UE may reduce the number of searching for the MSCI.

In some aspects, the MSCI may also indicate time-frequency resources for SL transmission within each group of multiple slots. In one aspect, each MSCI in the header slot may reserve the time-frequency resources for all the k groups of multiple slots including the header slots and the reserved slots within each group of multiple slots.

Referring to FIG. 7A, a first header slot 710 of a first group of multiple slots may indicate a second header slot 720 of a second group of multiple slots and a third header slot 730 of a third group of multiple slots. The first header slot 710 may also reserve slots 712 and 714 within the first group of multiple slots, slots 722 and 724 within the second group of multiple slots, and slots 732, 734, and 736 within the third group of multiple slots.

Accordingly, the transmitting UE may reserve time-frequency resources for the first group of multiple slots, the second group of multiple slots, and the third group of multiple slots at one time using the first header slot 710 of the first group of multiple slots, and the receiving UE may use resource selection timeline for the first, second, and third groups of multiple slots as indicated in the first header slot 710 of the first group of multiple slots. The transmitting UE may reserve many slots potentially, resulting in a large payload of the MSCI and reduce the payload of each group of multiple slots using the same reservation pattern.

In another aspect, each MSCI in the header slot may reserve time-frequency resources only for the current group of multiple slots. Referring to FIG. 7B, a first header slot 752 of a first group of multiple slots may indicate a second header slot 754 of a second group of multiple slots and a third header slot 756 of a third group of multiple slots. The first header slot 752 may reserve slots 712 and 714 within the first group of multiple slots. The second header slot 754 may reserve slots 722 and 724 within the second group of multiple slots. The third header slot 756 may reserve slots 732, 734, and 736 within the third group of multiple slots.

Accordingly, the number of slots reserved may be limited to the slots within each group of multiple slots, and the payload for the MSCI may be reduced. The transmitting UE may need to perform resource selection for each group of multiple slots.

In some aspects, the UE may perform congestion control in SL communication using channel busy ratio (CBR) and/or channel occupancy ratio (CR). The CBR may be defined as an estimated number of time-frequency resources observed by a UE as being used by the network divided by the number of the total available time-frequency resources. The CR may be defined as an estimated number of time-frequency resources used by the UE is using divided by the number of total available time-frequency resources.

The base station may provide an upper limit to the CR to the UE for the UE to perform the congestion control in SL communication. In some aspects, the base station may select a CR limit (the upper limit to the CR) based on the CBR measurement and configure a higher layer parameter for a CR limit for the UE. That is, the base station may transmit an RRC message including the CR limit information element, e.g., sl-CR-Limit, to configure the CR limit of the UE. The CR limit parameter may indicate the maximum limit on the occupancy ratio. If the base station determines that the congestion level of the network is high, the base station may reduce the CR limit for the UE, which may further limit the transmission of the PSSCH and reduce the congestion level of the network. The base station may reduce the CR limit for the UE in response to determining that the CBR measurement is greater than a threshold value.

In some aspects, the UE may use the CR to control congestion in SL resource allocation. That is, the UE may be configured with higher layer parameter sl-CR-Limit, which provides the upper limit of the CR in transmitting PSSCH in slot n, and the UE may transmit the PSSCH in the slot n based on the following limits for any priority value k:

$$\sum_{i \geq k} CR(i) \leq CR_{limit}(k)$$

where CR(i) is the CR evaluated in slot n–N for the PSSCH transmissions with priority field in the SCI set to i, and the $CR_{limit}(k)$ may correspond to the high layer parameter sl-CR-Limit that is associated with the priority value k and the CBR range, which includes the CBR measured in slot n–N, where N is the congestion control processing time. For example, N may range from 2 to 16, depending on the subcarrier spacing and UE capability.

The UE may determine how to meet the above limits. For example, the UE may drop the transmissions in the slot n in response to the CR evaluated in slot n–N being greater than the CR limit.

In some aspects, evaluating the CR measurement at slot n may be defined as the total number of sub-channels used over slots [n–a, n+b] divided by the total number of configured sub-channels in the transmission pool over slots [n–a, n+b]. That is, the CR measurement at slot n may be evaluated as the total number of sub-channels used for transmission in slots [n–a, n–1] and granted in slots [n, n+b], divided by the total number of configured sub-channels in the transmission pool over [n–a, n+b]. Here, "a" may be a positive integer and "b" may be 0 or a positive integer, where "a" and "b" may be determined by UE implementation with a+b+1=1000 or 1000.24 slots, according to a higher layer parameter timeWindowSize-CR, b<(a+b+1)/2, and n+b may not exceed the last transmission opportunity of the grant for the current transmission.

The Sub-channel may include multiple numbers of physical resource blocks (PRBs) based on parameters received from the base station. For example, the base station may transmit RRC message including sub-channel size information element, e.g., sl-SubchannelSize, in SL-ResourcePool.

In some aspects, when computing CR, the sub-channels already used for its transmissions in slots [n–a, n–1] and granted sub-channels in slots [n, n+b] may have the same weight. However, the granted slots for sub-channels may be overridden by other SL transmissions with higher priority. Accordingly, the CR computation of applying the same weight to the granted sub-channels may be conservative. In one aspect, the SL UE may reserve many slots for repeated transmission, such as the group of multiple slots reserved using the MSCI in the future slots may be more likely to be overridden by the other SL transmissions with higher priority.

In some aspects, the base station may designate a weighting factor for the UE to use in evaluating the CR measurement, and the UE may scale the count of the sub-channels granted for the future based on the weighting factor defined by the base station. For example, the weighting factor may be referred to as a "successful future reservation factor," configured to weigh the count of future reserved sub-channels.

In some aspects, the weighting factor may be dependent on the congestion level of the network. That is, the base station may configure different weighting factors based on the congestion level of the network. In one aspect, the weighting factor may be dependent on the CBR measurement. In another aspect, the base station may determine a different weighting factor based on the CBR measurement and transmit the new weighting factor to the UE for the UE to use in the evaluation of CR measurement.

The weighting factor may be dependent on priority. That is, the weighting factor to be applied to the granted sub-channels may depend on the priority of the PSSCH transmission scheduled for transmission in the granted sub-channels. The weighting factor may have a greater value based on the PSSCH transmission scheduled for transmission in the granted sub-channels having a higher value, i.e., a priority greater than a threshold value. For example, the base station may provide the UE with multiple weighting factors, each weighting factor associated with a different priority level. As an example, the UE may use a table with weight factor entries for different priority levels when applying congestion control for SL transmission.

The weighting factor for each granted sub-channel may be dependent on the offset between the slot of each granted sub-channel and the current slot. In one aspect, the weighting factor may have a value less than or equal to 1 and applied to all future reserved slots. That is, when evaluating the CR, the number of the reserved sub-channels in slots [n, n+b] may have a weight less than or equal to the weight of the number of the sub-channels already used for its transmissions in slots [n–a, n–1]. Accordingly, the number of reserved sub-channels in slots [n, n+b] may have less effect on the CR evaluation than the number of reserved sub-channels in slots [n, n+b].

In some aspects, the weighting factor may be a mapping or a table from the future slots to values less than or equal to 1. That is, the weighting factor may be provided as a mapping, i.e., bitmap, or a table of weighting factors based on certain criteria.

In one aspect, the further away from the reserved slot from the current slot, the lower the value of the weighting factor. That is, the weighting factor may be configured such that the value of the weighting factor is smaller for the reserved sub-channels in a slot further from the current slot.

In one aspect, the weighting factor may be different for a single slot header and a header slot. That is, the weighting factor may be configured such that the value of the weighting factor is smaller for the header slot. The header slot may include MSCI indicating scheduling information for repeated transmission. The header slot may also include MSCI indicating reserved resources that are identical with a previous MSCI included in a previous header slot. Accordingly, the granted sub-channels including the header slot may be more likely to be overridden by other SL transmissions with higher priority.

Figure 8:
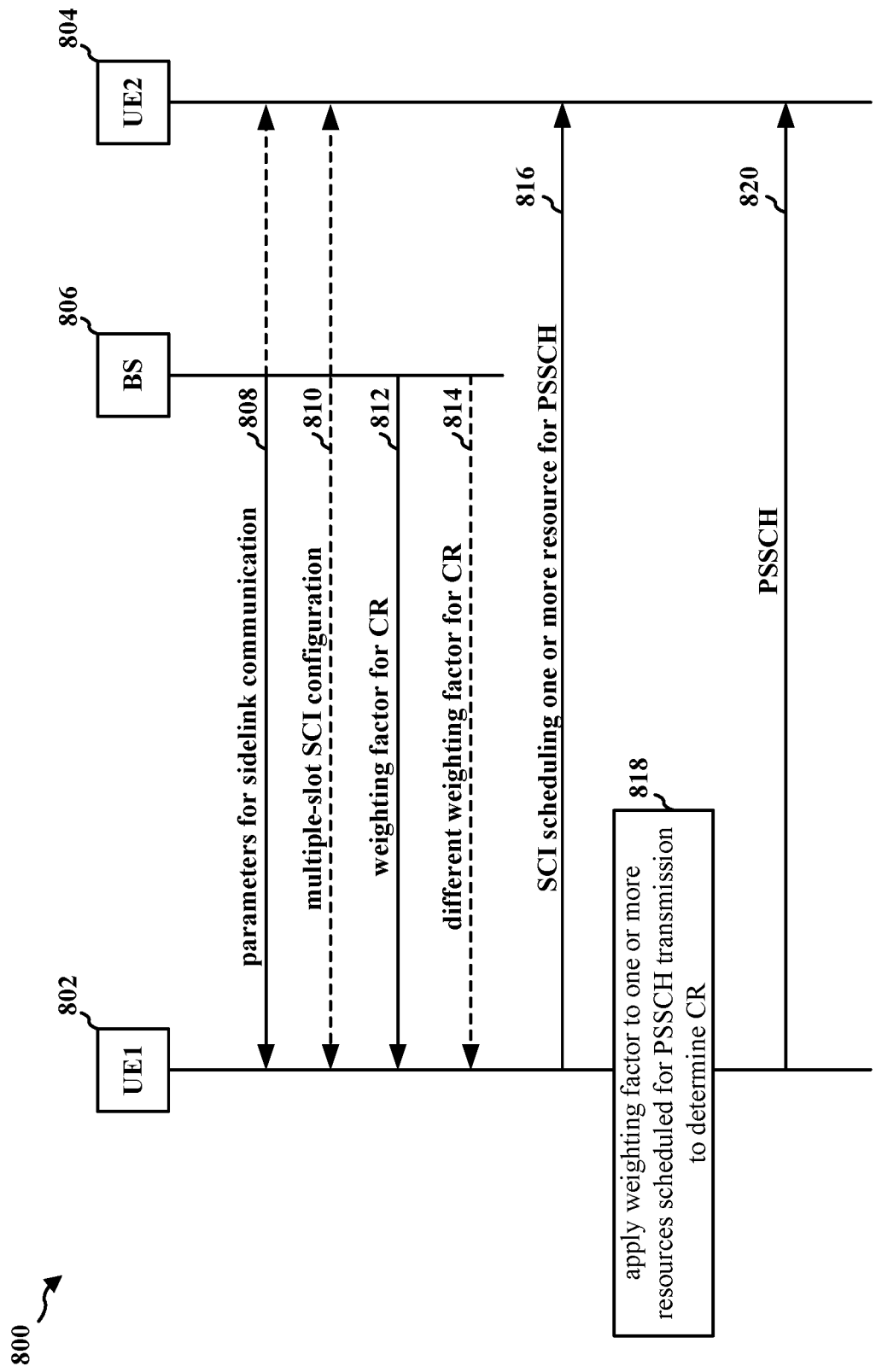
FIG. 8 is a communication diagram of a method of wireless communication.

FIG. 8 is a communication diagram 800 of a method of wireless communication. The communication diagram 800 may include a first UE 802, a second UE 804, and a base station 806. At 808, the base station 806 configures at least one of the first UE 802 or the second UE 804 with one or more parameters for SL communication. That is, the base station 806 may determine and transmit parameters for transmitting and receiving SL communication to the first UE 802 and the second UE 804. The parameters for transmitting and receiving SL communication may be transmitted to the first UE 802 and the second UE 804 using an RRC message. At 810, the base station 806 may configure at least one of the first UE 802 or the second UE 804 to transmit a multiple-slot SCI for scheduling resources in more than one slot.

At 812, the base station 806 configures the first UE 802 to use at least one weighting factor associated with a CR for the first UE 802. That is, the base station 806 may determine and transmit the indication of at least one weighting factor that the first UE 802 may use to evaluate the CR. The first UE 802 may receive, from the base station 806, an indication of at least one weighting factor. That is, the first UE 802 may receive the indication of at least one weighting factor, which the first UE 802 may use to evaluate the CR.

In one aspect, at least one weighting factor is less than or equal to 1. In another aspect, at least one weighting factor may be dependent on a priority of the PSSCH transmission scheduled for transmission in at least one slot. In another aspect, at least one weighting factor may be dependent on a CBR measurement of at least one slot of the PSSCH. In some aspects, at least one weighting factor may include multiple weighting factors. In one aspect, the multiple weighting factors may be mapped to the multiple slots. In one aspect, at least one weighting factor for the CR calculation is preconfigured.

At 814, the base station 806 may configure a different weighting factor for the first UE 802 based on a congestion level of a network. That is, the base station 806 may configure different weighting factors based on the congestion level of the SL network. In one aspect, the base station 806 may determine a different weighting factor based on the CBR measurement and transmit the new weighting factor to the first UE 802 for the first UE 802 to use in the evaluation of the CR measurement. In some aspects, the weighting factor transmitted at 812 or 814 may be transmitted in information about at least one weighting factor to the first UE 802 in the RRC signaling.

At 816, the first UE 802 transmits SCI scheduling one or more resources for PSSCH transmission in at least one slot. In one aspect, the SCI may be MSCI for scheduling resources in at least one slot. Particularly, the first UE 802 may transmit the PSSCH in the slot n based on the following limits for any priority value k: $\Sigma_{i \geq k} CR(i) \leq CR_{limit}(k)$, where $CR(i)$ is the CR evaluated in slot n–N for the PSSCH transmissions with priority field in the SCI set to i, and $CR_{limit}(k)$ may correspond to the upper limit of the CR in transmitting PSSCH in slot n.

At 818, the first UE 802 applies at least one weighting factor to the one or more resources scheduled for the PSSCH transmission to determine or calculate a CR for the first UE 802. In one aspect, at least one weighting factor may be applied to one or more resources in each of multiple slots scheduled for transmission of a PSSCH. In one aspect, the SCI may be MSCI for scheduling resources in multiple slots, and at least one weighting factor may include multiple weighting factors. In another aspect, at least one weighting factor may include multiple weighting factors, and the first UE 802 may apply a first weighting factor to the one or more resources scheduled in a first slot and apply a second weighting factor to the one or more resources scheduled in a second slot, the first weighting factor being greater than the second weighting factor and the first slot being closer to a current slot than the second slot. In another aspect, the MSCI may schedule resources in multiple slots, and the first UE 802 may apply a different weighting factor for the one or more resources scheduled by the MSCI in the multiple slots than for a single slot reservation. In another aspect, a greater weighting factor may be applied to the first slot of at least one slot that includes MSCI configured to schedule one or more resources in more than one slot for the PSSCH transmission.

At 820, the first UE 802 transmits the PSSCH in one or more resources of at least one slot based on the calculated CR being less than or equal to a CR threshold value.

Figure 9:
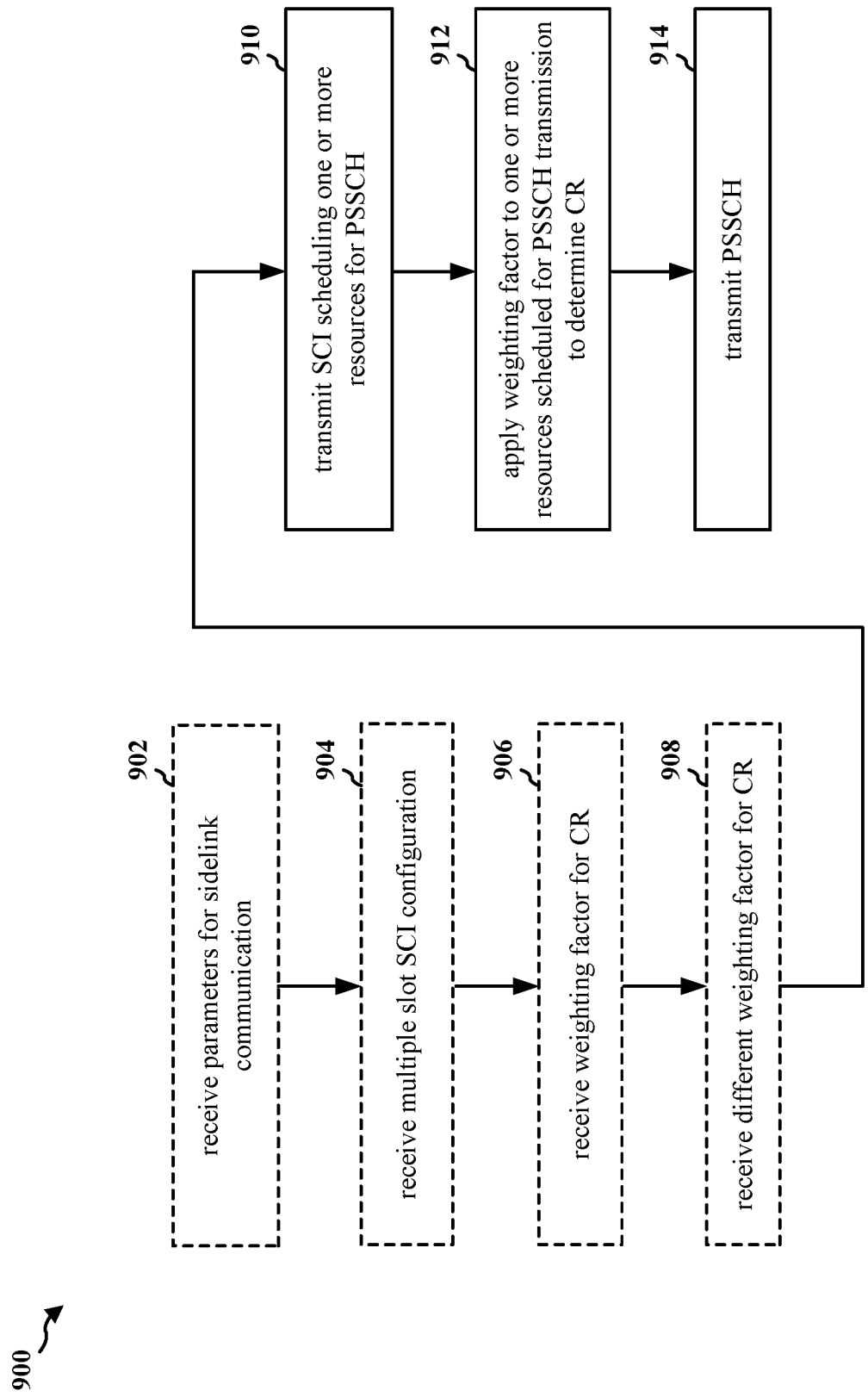
FIG. 9 is a flowchart of a method of wireless communication.

FIG. 9 is a flowchart 900 of a method of wireless communication. The method may be performed by a UE (e.g., the UE 104/802/804; the apparatus 1102). One or more of the aspects illustrated in FIG. 9 may be optional. Various implementations may include a method with any combination of the aspects described in connection with FIG. 9. The UE may receive, from a base station, a weighting factor to apply when estimating the number of the total number of sub-channels in the granted slots in evaluating the CR measurement to determine whether to transmit the PSSCH.

At 902, the UE may receive, from the base station, one or more parameters for configuring SL communication. That is, the UE may receive the parameters for transmitting and receiving SL communication. The parameters for transmitting and receiving SL communication may be received from the base station using an RRC message. For example, 902 may be performed by an SL managing component 1140.

At 904, the UE may receive, from the base station, one or more parameters for transmitting MSCI for scheduling resources in more than one slot. For example, 904 may be performed by a multiple-slot SCI component 1142.

At 906, the UE may receive, from the base station, an indication of at least one weighting factor that the UE may use to evaluate the CR. That is, the UE may receive the indication of at least one weighting factor, which the first UE may use to evaluate the CR. In one aspect, at least one weighting factor is less than or equal to 1. In another aspect, at least one weighting factor may be dependent on a priority of the PSSCH transmission scheduled for transmission in at least one slot. In another aspect, at least one weighting factor may be dependent on a CBR measurement of at least one slot of the PSSCH. In some aspects, at least one weighting factor may include multiple weighting factors. In one aspect, the multiple weighting factors may be mapped to the multiple slots. In one aspect, at least one weighting factor for the CR calculation is preconfigured. For example, 906 may be performed by an SL CR evaluation component 1144.

At 908, the UE may receive, from the base station, a different weighting factor for the first UE based on a congestion level of the SL network. That is, the base station may configure different weighting factors based on the congestion level of the network. In one aspect, the different weighting factor may be determined based on the CBR measurement, and the UE may use the new weighting factor received from the base station in the evaluation of the CR measurement. For example, 908 may be performed by the SL CR evaluation component 1144.

In some aspects, the weighting factor received at 906 or 908 may be received in information about at least one weighting factor from the base station in the RRC signaling.

At 910, the UE transmits SCI scheduling one or more resources for PSSCH transmission in at least one slot. In one aspect, the SCI may be MSCI for scheduling resources in multiple slots. Particularly, the first UE may transmit the PSSCH in the slot n based on the following limits for any priority value k: $\Sigma_{i \geq k} CR(i) \leq CR_{limit}(k)$, where CR(i) is the CR evaluated in slot n–N for the PSSCH transmissions with priority field in the SCI set to i, and $CR_{limit}(k)$ may correspond to the upper limit of the CR in transmitting PSSCH in slot n. For example, 910 may be performed by the SL managing component 1140.

At 912, the UE applies at least one weighting factor to the one or more resources scheduled for the PSSCH transmission in the at least one slot to determine a CR for the first UE. In one aspect, at least one weighting factor may be applied to one or more resources in each of at least one slot scheduled for transmission of a PSSCH. In one aspect, the SCI may be MSCI for scheduling resources in multiple slots, and at least one weighting factor may include multiple weighting factors. In another aspect, at least one weighting factor may include multiple weighting factors, and the first UE may apply a first weighting factor to the one or more resources scheduled in a first slot and apply a second weighting factor to the one or more resources scheduled in a second slot, the first weighting factor being greater than the second weighting factor and the first slot being closer to a current slot than the second slot. In another aspect, the MSCI may schedule resources in multiple slots, and the first UE may apply a different weighting factor for the one or more resources scheduled by the MSCI in the multiple slots than for a single slot reservation. In another aspect, a greater weighting factor may be applied to the first slot of at least one slot that includes MSCI configured to schedule one or more resources in more than one slot for the PSSCH transmission. For example, 912 may be performed by the SL CR evaluation component 1144.

At 914, the UE transmits the PSSCH in one or more resources of at least one slot based on the calculated CR being less than or equal to a CR threshold value. For example, 914 may be performed by the SL managing component 1140.

Figure 10:
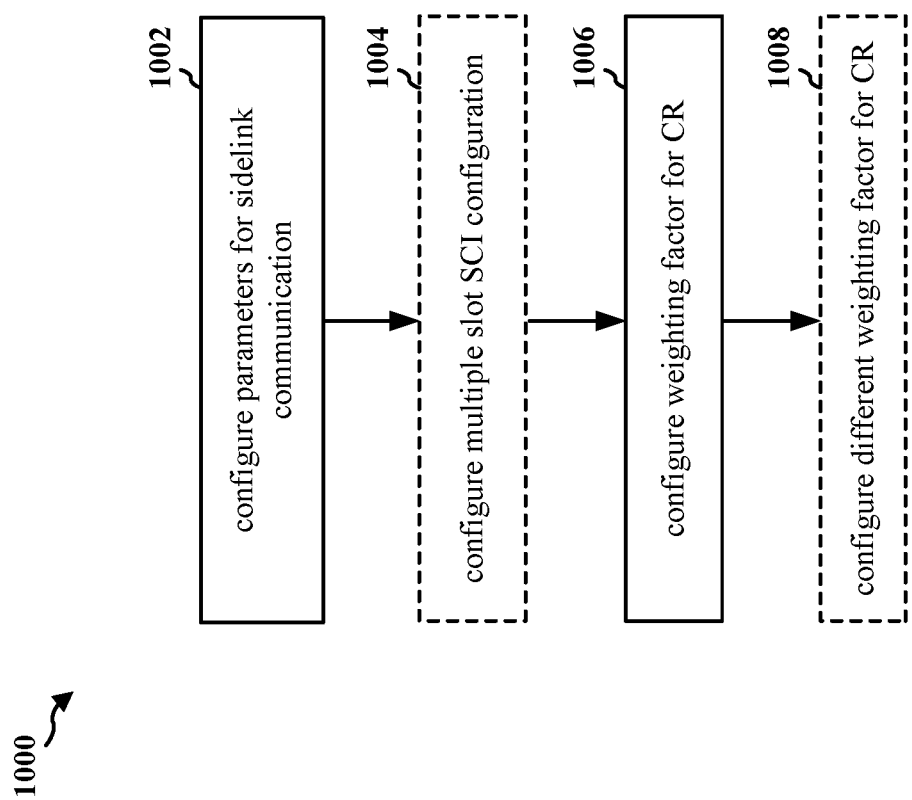
FIG. 10 is a flowchart of a method of wireless communication.

FIG. 10 is a flowchart 1000 of a method of wireless communication. The method may be performed by a base station (e.g., the base station 102/180/806; the apparatus 1202). One or more of the aspects illustrated in FIG. 10 may be optional. Various implementations may include a method with any combination of the aspects described in connection with FIG. 10. The base station may provide a weighting factor for the UE to apply when estimating the number of the total number of sub-channels in the granted slots in evaluating the CR measurement to determine whether to transmit the PSSCH.

At 1002, the base station configures at least one of the first UE or the second UE with one or more parameters for SL communication. That is, the base station may determine and transmit parameters for transmitting and receiving SL communication to the first UE and the second UE. The parameters for transmitting and receiving SL communication may be transmitted to the first UE and the second UE using an RRC message. For example, 1002 may be performed by an SL configuring component 1240.

At 1004, the base station may configure at least one of the first UE or the second UE to transmit a multiple-slot SCI for scheduling resources in more than one slot. For example, 1004 may be performed by a multiple-slot SCI component 1242.

At 1006, the base station instructs the first UE to apply at least one weighting factor associated with a CR for the first UE. That is, the base station may determine and transmit the indication of at least one weighting factor that the first UE may use to evaluate the CR. The first UE may receive, from the base station, an indication of at least one weighting factor. That is, the first UE may receive the indication of at least one weighting factor, which the first UE may use to evaluate the CR. In one aspect, at least one weighting factor is less than or equal to 1. In another aspect, at least one weighting factor may be dependent on a priority of the PSSCH transmission scheduled for transmission in at least one slot. In another aspect, at least one weighting factor may be dependent on a CBR measurement of at least one slot of the PSSCH. In some aspects, at least one weighting factor may include multiple weighting factors. In one aspect, the multiple weighting factors may be mapped to the multiple slots. In one aspect, at least one weighting factor for the CR calculation is preconfigured. For example, 1006 may be performed by an SL CR factor component 1244.

At 1008, the base station may configure a different weighting factor for the first UE based on a congestion level of a network. That is, the base station may configure different weighting factors based on the congestion level of the SL network. In one aspect, the base station may determine a different weighting factor based on the CBR measurement and transmit the new weighting factor to the first UE for the first UE to use in the evaluation of the CR measurement. For example, 1008 may be performed by the SL CR factor component 1244.

In some aspects, the weighting factor transmitted at 1006 or 1008 may be transmitted in information about at least one weighting factor to the first UE in the RRC signaling.

Figure 11:
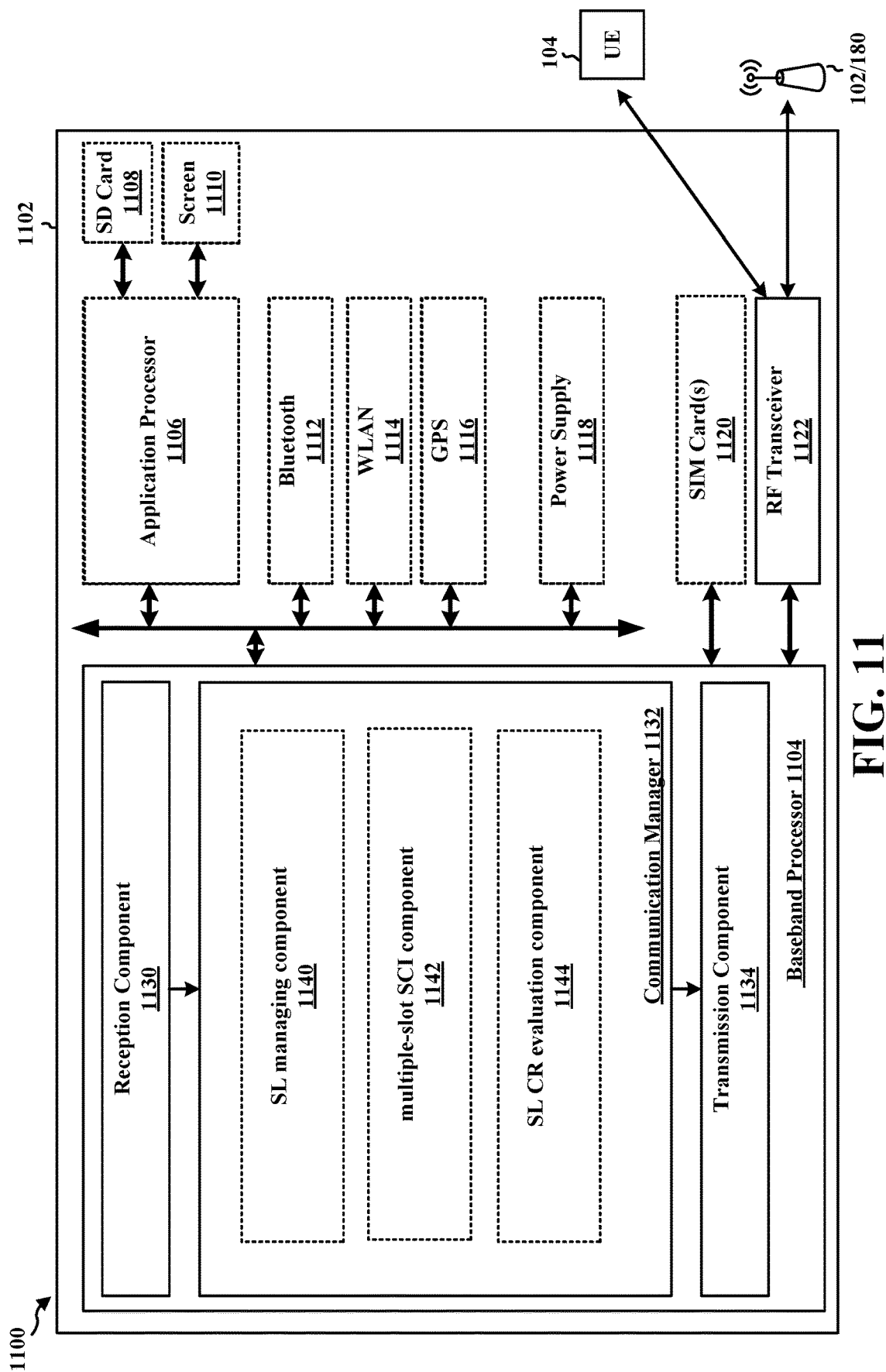
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, or another device configured to transmit and/or receive SL communication. The apparatus 1102 includes a baseband processor 1104 (also referred to as a modem) coupled to an RF transceiver 1122. In some aspects, the baseband processor 1104 may be a cellular baseband processor and/or the RF transceiver 1122 may be a cellular RF transceiver. The apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, and/or a power supply 1118. The baseband processor 1104 communicates through the RF transceiver 1122 with the UE 104 and/or BS 102/180. The baseband processor 1104 may include a computer-readable medium/memory. The computer-readable medium/memory may be non-transitory. The baseband processor 1104 is responsible for general processing, including the execution of software stored on the computer-readable medium/memory. The software, when executed by the baseband processor 1104, causes the baseband processor 1104 to perform the various functions described in the present application. The computer-readable medium/memory may also be used for storing data that is manipulated by the baseband processor 1104 when executing software. The baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband processor 1104. The baseband processor 1104 may be a component of the device 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes an SL managing component 1140 that is configured to receive one or more parameters for configuring SL communication, transmit SCI scheduling one or more resources for PSSCH transmission in at least one slot, and transmit the PSSCH in one or more resources of at least one slot based on the calculated CR being less than or equal to a CR threshold value, e.g., as described in connection with 902, 910, and 914. The communication manager 1132 further includes a multiple-slot SCI component 1142 that is configured to receive one or more parameters for transmitting MSCI for scheduling resources in more than one slot, e.g., as described in connection with 904. The communication manager 1132 further includes an SL CR evaluation component 1144 that is configured to receive an indication of at least one weighting factor that the UE may use to evaluate the CR, receive a different weighting factor for the first UE based on a congestion level of the SL network, and apply at least one weighting factor to the one or more resources scheduled for the PSSCH transmission in the at least one slot to determine a CR for the first UE, e.g., as described in connection with 906, 908, and 912.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 1102, and in particular the baseband processor 1104, includes means for transmitting SCI scheduling one or more resources for PSSCH transmission in at least one slot, means for applying at least one weighting factor to the one or more resources scheduled for the PSSCH transmission to determine a CR for the UE, and means for transmitting the PSSCH in the one or more resources scheduled for the PSSCH in the at least one slot based on the determined CR being less than or equal to a CR threshold value. The apparatus 1102 includes means for receiving, from a base station, an indication of at least one weighting factor. The apparatus 1102 includes means for applying a first weighting factor to the one or more resources scheduled in a first slot and applying a second weighting factor to the one or more resources scheduled in a second slot, the first weighting factor being greater than the second weighting factor and the first slot being closer to a current slot than the second slot, and means for applying a different weighting factor for the one or more resources scheduled by the SCI in the multiple slots than for a single slot reservation. The means may be one or more of the components of the apparatus 1102 configured to perform the functions recited by the means. As described herein, the apparatus 1102 may include the TX processor 368, the RX processor 356, and the controller/processor 359. As such, in one configuration, the means may be the TX processor 368, the RX processor 356, and the controller/processor 359 configured to perform the functions recited by the means.

Figure 12:
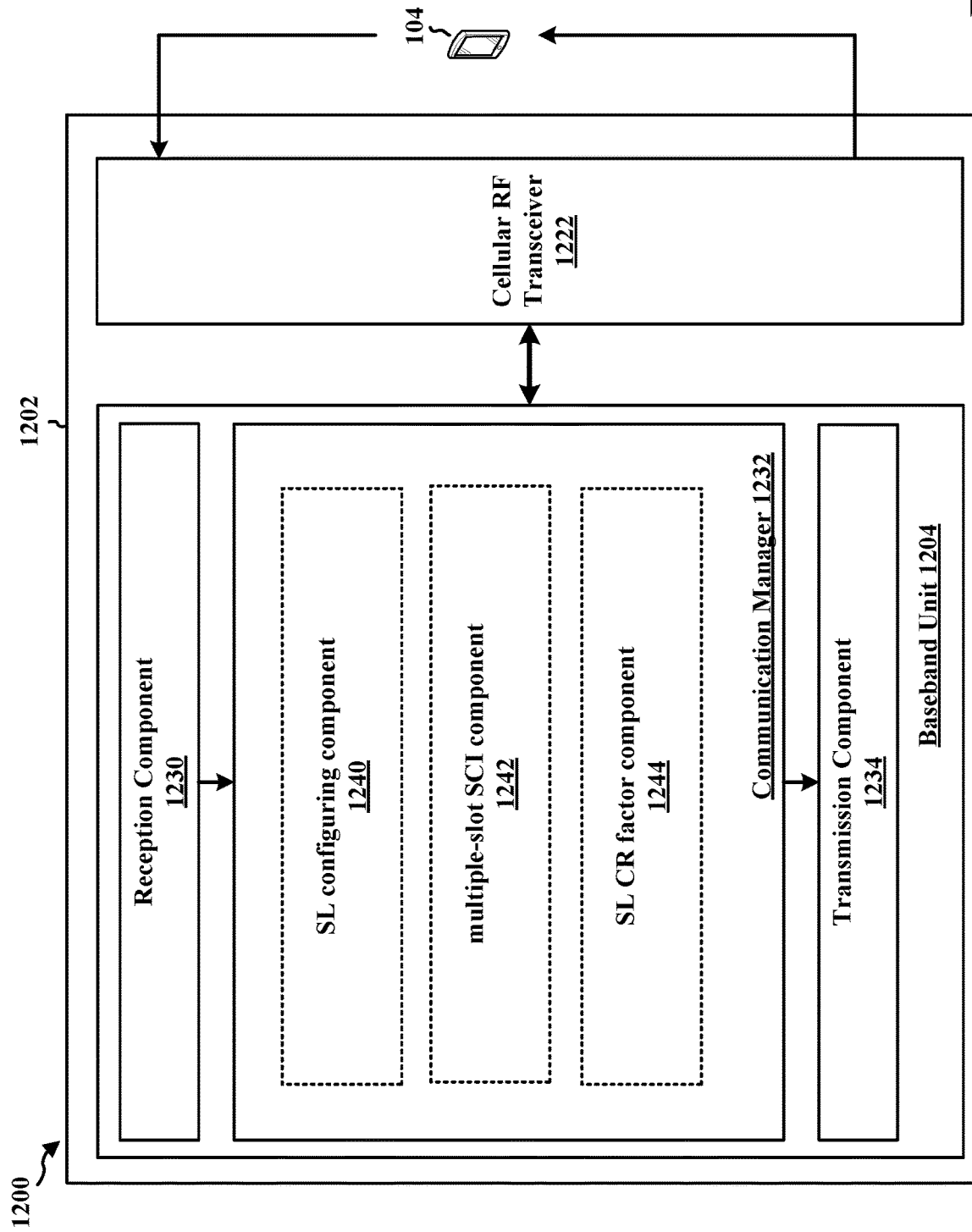
FIG. 12 is a diagram illustrating an example of a hardware implementation for an example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the devices 310 and may include the memory 376 and/or at least one of the TX processor 316, the RX processor 370, and the controller/processor 375.

The communication manager 1232 includes an SL configuring component 1240 that configures at least one of the first UE or the second UE with one or more parameters for SL communication, e.g., as described in connection with 1002. The communication manager 1232 further includes a multiple-slot SCI component 1242 that configures at least one of the first UE or the second UE to transmit a multiple-slot SCI for scheduling resources in more than one slot, e.g., as described in connection with 1004. The communication manager 1232 further includes an SL CR factor component 1244 that is configured to instruct the first UE to use at least one weighting factor associated with a CR for the first UE and configure a different weighting factor for the first UE based on a congestion level of a network, e.g., as described in connection with 1006 and 1008.

The apparatus may include additional components that perform each of the blocks of the algorithm in the aforementioned flowcharts of FIGS. 8 and 10. As such, each block in the aforementioned flowcharts of FIGS. 8 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for configuring a UE with one or more parameters for sidelink communication, and means for instructing the UE to apply at least one weighting factor associated with a CR for the UE. The apparatus 1202 includes means for configuring the UE to transmit SCI scheduling resources in more than one slot, and means for configuring a different weighting factor for the UE based on a congestion level of a network. The aforementioned means may be one or more of the aforementioned components of the apparatus 1202 configured to perform the functions recited by the aforementioned means. As described supra, the apparatus 1202 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with aspects of other examples or teachings described herein, without limitation.

Aspect 1 is a method for wireless communication at a UE, the method including transmitting SCI scheduling one or more resources for PSSCH transmission in at least one slot, applying at least one weighting factor to the one or more resources scheduled for the PSSCH transmission to determine a CR for the UE, and transmitting the PSSCH in the one or more resources scheduled for the PSSCH in the at least one slot based on the determined CR being less than or equal to a CR threshold value.

Aspect 2 is the method of aspect 1, further including receiving, from a base station, an indication of at least one weighting factor.

Aspect 3 is the method of any of aspects 1 or 2, where the at least one weighting factor is less than or equal to 1.

Aspect 4 is the method of any of aspects 1 to 3, where the at least one weighting factor is applied to the one or more resources in each of multiple slots scheduled for transmission of a PSSCH.

Aspect 5 is the method of any of aspects 1 to 4, where the at least one weighting factor is dependent on a priority of the PSSCH transmission scheduled in the at least one slot.

Aspect 6 is the method of aspect 5, where the at least one weighting factor is dependent on a CBR measurement at the at least one slot of the PSSCH.

Aspect 7 is the method of any of aspects 1 to 6, where the at least one weighting factor includes multiple weighting factor, and applying the at least one weighting factor to the one or more resources scheduled for the PSSCH transmission includes applying a first weighting factor to the one or more resources scheduled in a first slot and applying a second weighting factor to the one or more resources scheduled in a second slot, the first weighting factor being greater than the second weighting factor and the first slot being closer to a current slot than the second slot.

Aspect 8 is the method of any of aspects 1 to 7, where the SCI schedules resources in multiple slots, and where the at least one weighting factor includes multiple weighting factors.

Aspect 9 is the method of aspect 8, where the multiple weighting factors are mapped to the multiple slots.

Aspect 10 is the method of any of aspects 1 to 9, where the SCI schedules resources in multiple slots, and where applying the at least one weighting factor includes applying a different weighting factor for the one or more resources scheduled by the SCI in the multiple slots than for a single slot reservation.

Aspect 11 is the method of any of aspects 1 to 10, where the at least one weighting factor for determining the CR is preconfigured.

Aspect 12 is the method of any of aspects 1 to 11, where a greater weighting factor is applied to a first slot of the at least one slot that includes SCI configured to schedule the one or more resources in more than one slot for the PSSCH transmission.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a computer-readable medium storing computer executable code, where the code when executed by a processor causes the processor to implement a method as in any of aspects 1 to 12.

Aspect 16 is a method for wireless communication at a base station, including configuring a UE with one or more parameters for SL communication and instructing the UE to apply at least one weighting factor associated with a CR for the UE.

Aspect 17 is the method of aspect 16, further including configuring the UE to transmit SCI scheduling resources in more than one slot.

Aspect 18 is the method of any of aspects 16 or 17, where the at least one weighting factor includes multiple weighting factors.

Aspect 19 is the method of aspect 18, where the multiple weighting factors are mapped to different slots based on a multiple-slot reservation.

Aspect 20 is the method of any of aspects 16 to 19, where each of the at least one weighting factors has a value less than or equal to 1.

Aspect 21 is the method of any of aspects 16 to 20, where the at least one weighting factor is associated with a priority of an SL transmission.

Aspect 22 is the method of aspect 21, where the at least one weighting factor is associated with CBR measurement at one or more slots of PSSCH.

Aspect 23 is the method of any of aspects 16 to 22, where instructing the UE to apply the at least one weighting factor includes transmitting information about the at least one weighting factor to the UE in RRC signaling.

Aspect 24 is the method of any of aspects 16 to 23, further including configuring a different weighting factor for the UE based on a congestion level of a network.

Aspect 25 is an apparatus for wireless communication including at least one processor coupled to a memory and configured to implement a method as in any of aspects 16 to 24.

Aspect 26 is an apparatus for wireless communication including means for implementing a method as in any of aspects 16 to 24.

Aspect 27 is a computer-readable medium storing computer executable code, where the code when executed by a processor causes the processor to implement a method as in any of aspects 16 to 24.

What is claimed is:

1. An apparatus for wireless communication at a network node, comprising:
    memory; and
    one or more processors coupled to the memory and configured to cause the network node to:
        configure a user equipment (UE) with one or more parameters for sidelink communication; and
        instruct the UE to apply at least one weighting factor associated with a channel occupancy ratio (CR) for the UE, wherein the at least one weighting factor is configured to scale a count of one or more future reserved resources for a CR determination.

2. The apparatus of claim 1, wherein the one or more processors are further configured to cause the network node to configure the UE to transmit sidelink control information (SCI) that schedules resources in more than one slot.

3. The apparatus of claim 1, wherein the at least one weighting factor includes multiple weighting factors.

4. The apparatus of claim 3, wherein the multiple weighting factors map to different slots based on a multiple-slot reservation.

5. The apparatus of claim 1, wherein each of the at least one weighting factor has a value less than or equal to 1.

6. The apparatus of claim 1, wherein the at least one weighting factor is associated with a priority of a sidelink transmission.

7. The apparatus of claim 6, wherein the at least one weighting factor is associated with a channel busy ratio (CBR) measurement at one or more slots of physical sidelink shared channel (PSSCH).

8. The apparatus of claim 1, wherein to instruct the UE to apply the at least one weighting factor, the one or more processors are further configured to cause the network node to provide information about the at least one weighting factor to the UE in radio resource control (RRC) signaling.

9. The apparatus of claim 1, further comprising:
    one or more antennas coupled to the one or more processors, wherein the one or more processors are further configured to cause the network node to configure a different weighting factor for the UE based on a congestion level of a network.

10. A method of wireless communication at a network node, comprising:
    configuring a user equipment (UE) with one or more parameters for sidelink communication; and
    instructing the UE to apply at least one weighting factor associated with a channel occupancy ratio (CR) for the UE, wherein the at least one weighting factor is configured to scale a count of one or more future reserved resources for a CR determination.

11. The method of claim 10, wherein configuring the UE with the one or more parameters for the sidelink communication includes:
    configuring the UE to transmit sidelink control information (SCI) scheduling resources in more than one slot.

12. The method of claim 10, wherein the at least one weighting factor includes multiple weighting factors.

13. The method of claim 12, wherein the multiple weighting factors are mapped to different slots based on a multiple-slot reservation.

14. The method of claim 10, wherein each of the at least one weighting factor has a value less than or equal to 1.

15. The method of claim 10, wherein the at least one weighting factor is associated with a priority of a sidelink transmission.

16. The method of claim 15, wherein the at least one weighting factor is associated with a channel busy ratio (CBR) measurement at one or more slots of physical sidelink shared channel (PSSCH).

17. The method of claim 10, wherein instructing the UE to apply the at least one weighting factor includes:
    providing information about the at least one weighting factor to the UE in radio resource control (RRC) signaling.

18. The method of claim 10, further comprising:
    configuring a different weighting factor for the UE based on a congestion level of a network.

19. A non-transitory computer-readable storage medium storing computer executable code for wireless communication at a network node, where the code when executed by one or more processors causes the network node to:

configure a user equipment (UE) with one or more parameters for sidelink communication; and instruct the UE to apply at least one weighting factor associated with a channel occupancy ratio (CR) for the UE, wherein the at least one weighting factor is configured to scale a count of one or more future reserved resources for a CR determination.

20. The non-transitory computer-readable storage medium of claim 19, wherein the at least one weighting factor includes multiple weighting factors, and wherein the multiple weighting factors are mapped to different slots based on a multiple-slot reservation.

* * * * *